(12) United States Patent
McCoy (10) Patent No.: US 9,975,701 B2
(45) Date of Patent: May 22, 2018

(54) METHOD FOR DETECTING LEAKAGE IN AN UNDERGROUND HYDROCARBON STORAGE CAVERN

(71) Applicant: James N. McCoy, Wichita Falls, TX (US)

(72) Inventor: James N. McCoy, Wichita Falls, TX (US)

(*) Notice: Subject to any disclaimer, the term of this patent is extended or adjusted under 35 U.S.C. 154(b) by 256 days.

(21) Appl. No.: 14/696,387

(22) Filed: Apr. 25, 2015

(65) Prior Publication Data
US 2016/0312606 A1 Oct. 27, 2016

(51) Int. Cl.
*B65G 5/00* (2006.01)
*G01M 3/26* (2006.01)
*E21B 47/10* (2012.01)

(52) U.S. Cl.
CPC .............. *B65G 5/00* (2013.01); *E21B 47/101* (2013.01); *G01M 3/26* (2013.01)

(58) Field of Classification Search
CPC ................................ B65G 5/00; E21B 47/101
(Continued)

(56) References Cited

U.S. PATENT DOCUMENTS

| 2,772,564 A | 12/1956 | Dougherty |
| 2,792,708 A | 5/1957 | Johnston, Jr. |

(Continued)

FOREIGN PATENT DOCUMENTS

CN 100514018 C 12/2006

OTHER PUBLICATIONS

Berest P., Bergues J., Brouard B., Durup G., Guerber B., "A Tentative Evaluation of the MIT", Apr. 14-17, 1996, Houston SMRI Spring Meeting, Solution Mining Research Institute.
(Continued)

*Primary Examiner* — Hezron E Williams
*Assistant Examiner* — Alex Devito
(74) *Attorney, Agent, or Firm* — Dale B. Nixon (57) ABSTRACT

Underground storage caverns are used for the bulk storage of hydrocarbon liquids, such as crude oil and gases. The caverns are typically formed in salt formations by dissolving the salt and removing it with a flow of water. The cavern is accessed through a bore hole which has casing and internal tubing with an annulus between the casing and tubing. Some cavern bore holes may have casing, but no tubing. The cavern typically has hydrocarbon liquid above brine with an inert gas above the hydrocarbon liquid. In order to use the cavern, and periodically check it for physical integrity, it is necessary to test the cavern to determine if there is leakage from the cavern or the bore hole. The interface of the hydrocarbon liquid and overriding gas is moved downward by injecting gas into the annulus. Acoustic pulses are sent down the annulus through the gas to determine when the interface is located just below the end of the casing in the top of the cavern chimney (a reference level) by examining the return reflection pulse from the interface for a polarity inversion. When this is detected, a measured volume of gas is injected into the annulus. After a waiting period, the gas is released from the annulus and measured until the interface is detected by acoustic pulses to again be at the reference level. The volumes of injected gas and released gas are compared to determine if there has been leakage from the cavern. Alternative, the interface can be driven by gas pressure from the surface down to the casing bottom and back to the surface with gas volumes detecting leakage.

18 Claims, 10 Drawing Sheets

(58) Field of Classification Search
USPC .................................................... 73/40.5 A
See application file for complete search history.

(56) References Cited

U.S. PATENT DOCUMENTS

| | | | |
|---|---|---|---|
| 3,049,920 A | | 8/1962 | Allen |
| 3,062,012 A | | 11/1962 | Allen |
| 4,408,676 A | | 10/1983 | McCoy |
| 4,455,869 A | | 6/1984 | Broussard et al. |
| 4,474,053 A | | 10/1984 | Butler |
| 4,624,130 A | | 11/1986 | Faul |
| 4,720,995 A | | 1/1988 | Thiel |
| 5,117,399 A | * | 5/1992 | McCoy ................ E21B 47/042 367/107 |
| 5,285,388 A | | 2/1994 | McCoy |
| 7,051,808 B1 | | 4/2006 | Vinegar et al. |
| 8,473,227 B2 | | 6/2013 | Olson et al. |
| 8,583,378 B2 | | 11/2013 | Jacques et al. |
| 8,902,704 B2 | | 12/2014 | Zamow |
| 8,909,479 B2 | | 12/2014 | Kvernvold |

OTHER PUBLICATIONS

Brouard B., Gerard D., "Tightness Tests in Salt-Cavern Wells", Spring 2002 Meeting Apr. 28-May 1, 2002, Banff, Alberta, Canada, Solution Mining Research Institute.

Bary A., Crotogino F., Prevedel B., Berger, H., Brown, K., Frantz, J., Sawyer, W., Henzell, M., Mohmeyer K., Ren N., Stiles K., Xiong H., "Storing Natural Gas Underground", Summer 2002, pp. 2-17, Oilfield Review.

Berest P., Brouard B., "Safety of Salt Caverns Used for Underground Storage", 2002, 8th Portuguese Congress for Geotechnique.

Berest P., Brouard B., "Safety of Salt Caverns Used for Underground Storage", vol. 58 (2003), No. 3, pp. 361-384, Oil and Gas Science and Technology—rev. IFP.

Brouard B., Karimi-Jafari M., Berest P., Durup G., "Pressure Build-Up in a Sealed Cavern: The effect of a Gas Blanket", Spring 2007 Conference, Apr. 2-May 2, 2007, Basel Switzerland, Solution Mining Research Institute.

Kansas Department of Health and Environment, "Nitrogen/Brine Interface Mechanical Integrity Test (MIT), Part I: Casing (Internal) MIT, Part II: Cavern (External) MIT", Jun. 6, 2011, Bureau of Water-Geology Section, Topeka, Kansas.

Brouard B., Berest P., Gillard P., "Set-Up of a Broken-Casings Detection System", SMRI Spring 2012 Technical Conference Apr. 23-24, 2012, Regina, Saskatchewan, Canada, Solution Mining Research Institute.

Brouard B., Berest P., Crabeil J., "Sounds Good? Determination of a Gas/Brine Interface by an Acoustic Method at Manosque", SMRI Fall 2012 Technical Conference, Oct. 1-2, 2012, Bremen, Germany, Solution Mining Research Institute.

* cited by examiner

METHOD FOR DETECTING LEAKAGE IN AN UNDERGROUND HYDROCARBON STORAGE CAVERN

CROSS REFERENCE TO RELATED APPLICATION(S)

Applicant has concurrently filed an application entitled "Method for Determining a Profile for an Underground Hydrocarbon Storage Cavern" which has Ser. No. 14/696,389 and was filed on Apr. 25, 2015.

BACKGROUND

1. Field of the Invention

The present invention pertains to the detection of leakage from an underground storage cavern which is used for the bulk storage of liquid hydrocarbons.

2. Description of the Related Art

A primary technique heretofore used for detecting leakage in storage caverns uses wireline equipment to lower sensors into the well bore for detecting the gas/liquid interface and typically for measuring other parameters such as temperature and pressure.

This equipment is used in conjunction with nitrogen gas injection to establish conditions for measuring leakage of gas or liquid from the cavern. Wireline equipment has the disadvantages of high cost, for both equipment and labor, and gas leakage through the wireline packoff (gasket) which is subject to friction deterioration due to the movement of the wire through the packoff.

BRIEF DESCRIPTION OF THE DRAWINGS

For a more complete understanding of the present invention and the advantages thereof, reference is now made to the following description taken in conjunction with the accompanying original drawings in which.

DETAILED DESCRIPTION OF THE INVENTION

Figure 1:
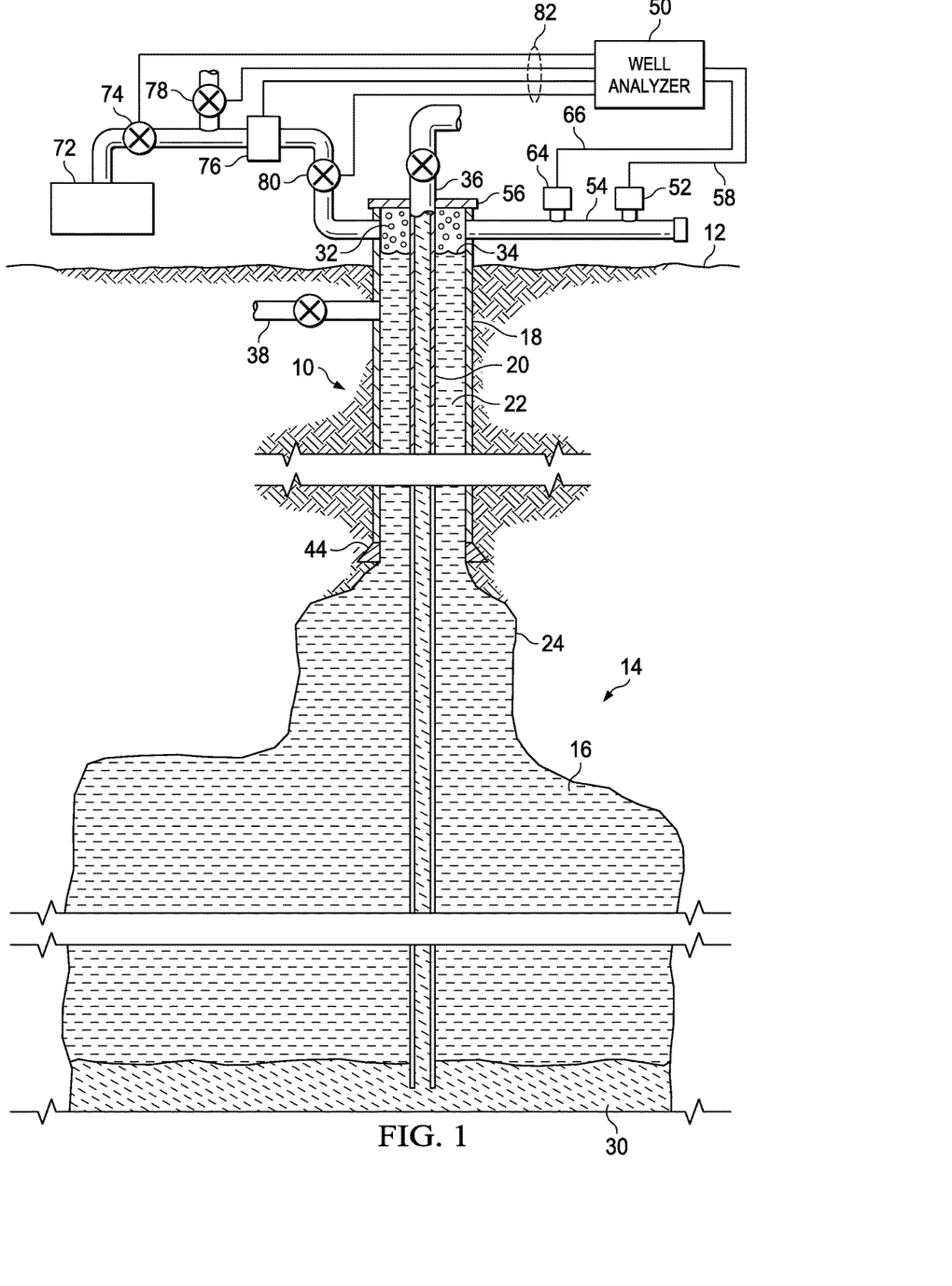
FIG. 1 is vertical section view of a hydrocarbon storage cavern together with casing, tubing and wellhead equipment.

Referring to FIG. 1, there is shown a well bore 10 which extends from the earth surface 12 down to an underground storage cavern 14. In this setting, the cavern 14 is used for the bulk storage of a liquid hydrocarbon 16 such as, for example, crude oil. Other liquid hydrocarbons include propane and butane. Within the well bore 10 there is a casing at the outer perimeter and a string of tubing 20 positioned in the interior of the casing 18. Not all storage cavern bore holes include the tubing 20. The tubing 20 comprises interconnected tubing joints. The space between the tubing 20 and the casing 18 is termed an annulus 22. The annulus 22 is a generally circular open passageway which allows for the transmission of liquids and gasses.

The storage cavern is also referred to as a storage well.

The cavern 10 is typically produced in a salt formation by pumping water down through the tubing 20 to dissolve the salt and returning the resulting brine up through the annulus 22. Additional equipment is used to shape the cavern. This process is continued until a cavern 14 of useful volume is produced. Caverns can be produced which have the capacity to hold millions of barrels of liquid product. The upper end of the cavern 14 typically has a region termed a chimney 24. In this representation, the chimney can have a diameter of approximately 8 to 10 feet and a vertical length of 200 feet. The cavern 14, as an example, can have a diameter of approximately two hundred feet and a vertical dimension of approximately 1,800 feet. The chimney could be located between 2,100 ft. and 2,200 ft. below the surface.

Such caverns are cost efficient and safe storage for volatile liquids and gasses, usually bulk hydrocarbons. But due to the large size, interior erosion and varying earth formations around the caverns, there is the possibility of leakage through any of the cavern walls or along the bore hole 10. Such leakage could result in substantial financial loss of a valuable resource, such as crude oil, and could lead to contamination of the surface, runoff into streams and lakes or pollution of sub-surface water. Therefore, it is important to be able to test these storage caverns for leakage to be assured that there is little or no leakage, or to take remedial steps if critical leakage is detected. Due to the very large storage volume of the caverns, there could be serious leakage with only an extremely small percentage of liquid loss from the cavern. Regulatory authorities typically require periodic testing of the caverns for leakage, and with many hundreds of caverns in use, the cost of such testing is significant. Therefore, there is a need for accurate, but less expensive, cavern leakage testing.

Further referring to FIG. 1, the cavern 14 has brine 30 at the bottom below the lighter liquid hydrocarbon 14. Typically the liquid 16 fills the annulus 22. An inert gas 32, such as nitrogen, is located above the liquid hydrocarbon 16 in the annulus 22 and chimney 24. There can be a gas/liquid interface 34 at the surface of the liquid hydrocarbon 16 with gas injection. Based on the volume of brine 30 and liquid hydrocarbon 16 in the annulus 22 and cavern 14, the interface 34 can be located in any one of the cavern 14, chimney 24 or annulus 22. The tubing 20 is typically filled with brine 30. The annulus 22 is typically filled to the surface with the liquid hydrocarbon 16. The liquid hydrocarbon 16 is removed from the cavern 14 by pumping brine 30 down the tubing 20 thereby lifting the liquid hydrocarbon 16 and forcing it upward through the annulus 22 where it is directed through a pipeline 38 to storage tanks or a pipeline elsewhere, such as a refinery. Alternatively, the injected gas need not be inert, for example, natural gas.

Still referring to FIG. 1, there is located at the lower end of the casing 18 a structure termed a casing shoe 44 which provides a transition from the lower end of the casing 18 to the interior surface of the chimney 24.

The apparatus used in conjunction with the present invention is shown in the upper portion of FIG. 1. An Echometer Company well analyzer 50, as shown at the site Echometer­.com, is connected to activate a gas gun 52 which is mounted to pipe joints 54 for acoustic communication through the wellhead 56 to the annulus 22. Representative gas guns are the models "Compact Gas Gun", "Remote Fire Gas Gun", Wireless Remote Gas Gun", "5K PSI Gas Gun", and 15K PSI Gas Gun", all made and sold by Echometer Company. A representative gas gun is also shown in U.S. Pat. No. 4,408,676, entitled "Gas Gun Assembly" and issued Oct. 11, 1983, and which is incorporated by reference herein. The gas gun 52 can be manually activated or activated by the well analyzer 50 via a cable 58, or equivalent wireless link. The gas gun 52 includes a microphone for recording the sounds carried through the annulus 22. Sensors 64, for pressure and/or temperature, are connected to the well analyzer 50 via cable 66, or equivalent wireless link.

Acoustic sounding operation and apparatus are described in U.S. Pat. No. 5,285,388 entitled "Detection of Fluid Reflection for Echo Sounding Operation" issued Feb. 8, 1994 and U.S. Pat. No. 5,117,399 entitled "Data Processing and Display for Echo Sounding Data" issued May 26, 1992, both of which are incorporated herein by reference.

The gas gun 52 produces an acoustic (pressure) pulse which is transmitted through the pipe joints 54 to the annulus 22 and then downward toward the gas/liquid interface 34. The acoustic pulse reflects from striking the interface 34 and returns up the annulus 22 and through the pipe joints 54 to the microphone in the gas gun 52. The microphone receives acoustic energy of the reflected pulse and transmits it as a signal to the well analyzer 50. A gas gun 52 can generate either a positive (increasing pressure) pulse by using an externally supplied source of compressed gas, or can vent gas from the pipe joints 54, and thus from the annulus 22, to produce a negative (decreasing pressure) pulse.

For the present invention, the preferred acoustic pulse is a rarefaction pulse which creates a pressure pulse by a reduction in pressure. This is preferred because of the pressure that is present in the casing. The rarefaction pulse is produced by venting a small volume of gas from the casing. However, compression pulses can also be used. These pulses are produced by introducing gas at a higher pressure into the casing. This produces a pulse which has a pressure increase. Another type of pulse which can be used is a frequency shift pulse. This pulse has a changing frequency during the period of the pulse. A frequency shift pulse is detected by a process termed correlation, which produces a correlation pulse. The correlation pulse can have polarity that is a function of the relative area of the conduction path, such as the casing, and the interface surface, just as with rarefaction and compression pulses.

There is further used in conjunction with an embodiment of the invention, a nitrogen gas tank 72 that is connected through piping to a valve 74, a nitrogen gas mass flow meter assembly 76 and a valve 80 to the wellhead 56 into the annulus 22. A model of the meter in assembly 76 is the Micro Motion product Elite Coriolis meter. When the valves 74 and 80 are opened, either manually or electrically, nitrogen gas from the tank 72 flows through the meter assembly 76 and wellhead 56 into the annulus 22. A valve 78, when opened with valve 74 closed and valve 80 open, will vent nitrogen gas from the annulus 22 into the atmosphere, or be recovered and compressed. Piping is included in the meter assembly 76 to direct the gas flow direction as needed. The meter in assembly 76 fundamentally measures mass for the gas transmitted through it, and the mass measurement can be converted to standard gas volume.

The valves 74, 78, and 80 and meter assembly 76 can be electrically controlled by the well analyzer 50 through cables 82.

Processes for operation of the invention are now described in reference to the Figures. A first process has two phases. Referring to FIG. 1, nitrogen gas is injected into the annulus 22 in a first phase and the gas is released from the annulus 22 in a second phase. An important aspect for accurately performing leakage detection is establishing a reference location for the gas/liquid interface 34.

Figure 2A:
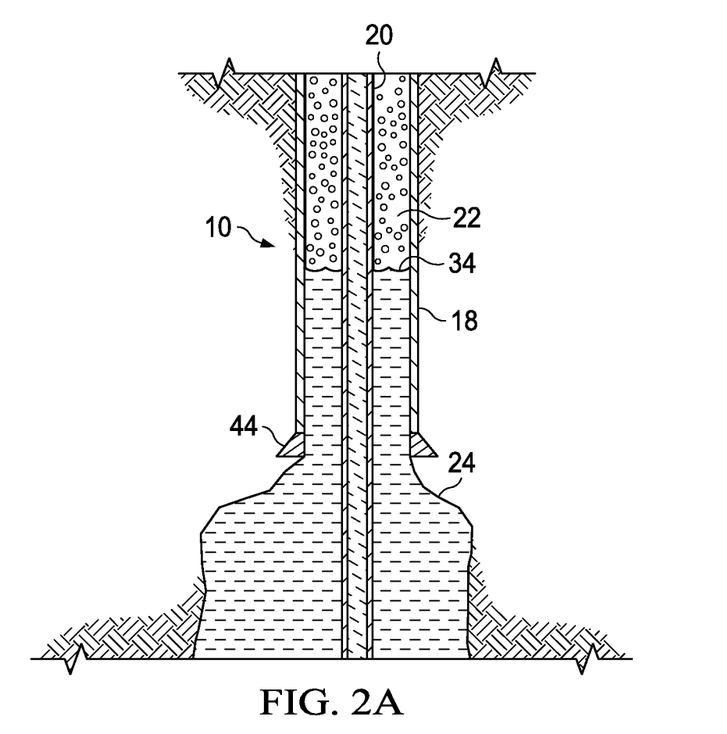
FIG. 2A is a partial section view of the cavern well bore shown in FIG. 1 showing a gas/liquid interface in the annulus.
Figure 2B:
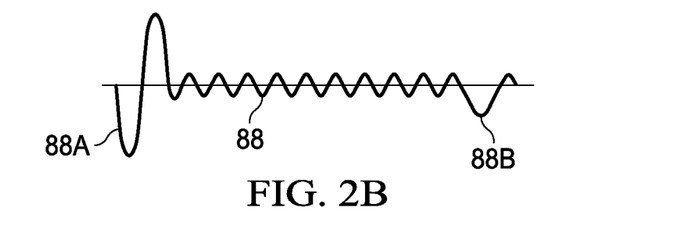
FIG. 2B is a waveform illustrating the signal monitored in the annulus at the surface as a result of an acoustic shot for the well illustration in FIG. 2A.

The first phase, injecting the nitrogen gas, is now described in reference to FIGS. 1, 2A, 2B, 3A, 3*b*, 4A, 4B and 9. The process begins with nitrogen gas injection into the annulus 22 from tank 72 via valve 74, meter assembly 76 and valve 80. During this first phase, the gas gun 52 is activated multiple times to produce acoustic shots 86, each shot represented as an "x". These can be at regular or irregular periods or at selected times. The initial shots are preferably rarefaction pulses produced by venting a small volume gas from the pressurized gas in the casing 18. Interface 34 is typically located in the annulus 22 near the surface 12 after a small volume of gas has been injected. As more nitrogen gas is injected into the annulus 22, the interface 34 is pushed downward. An acoustic shot signal 88 is shown in FIG. 2B taken when the interface 34 is located as shown in FIG. 2A. An initial pulse 88A is generated from the firing of the gas gun 52 and a reflection pulse 88B is returned after the pulse travels down to the interface 34, is reflected, and travels back to the microphone in the gas gun 52. For this embodiment of the invention, a negative going initial pulse indicates a rarefaction pulse which encounters a reduced annulus area, that is, the interface 34 reduces the annulus area to near zero. In FIG. 2B, the return is return has the same polarity as the initial pulse 88A, that is, negative going. Pulse 88B is not polarity inverted from pulse 88A.

Figure 3A:
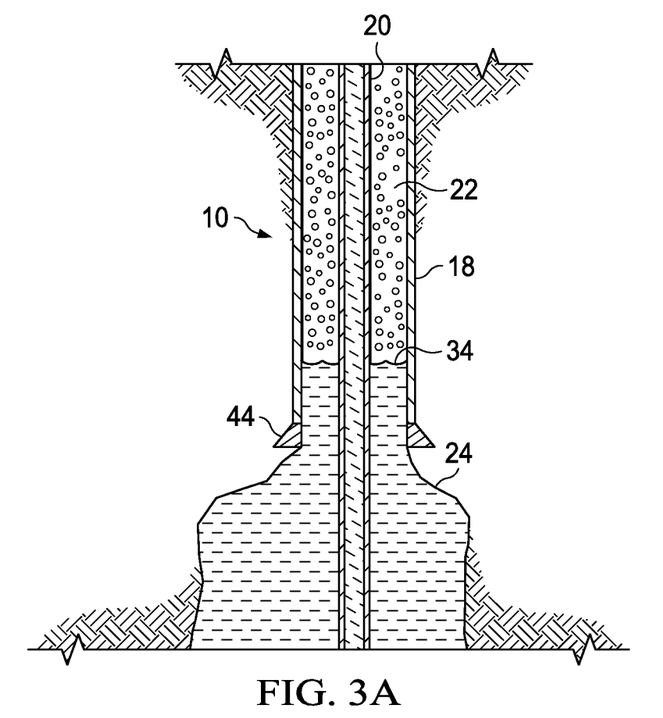
FIG. 3A is a partial section view of the cavern well bore shown in FIG. 1 showing a gas/liquid interface at a lower level from that shown in FIG. 2A.
Figure 3B:
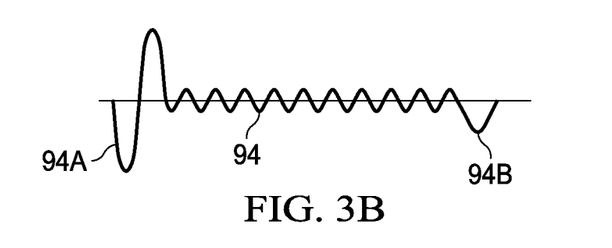
FIG. 3B is a waveform illustrating the signal monitored in the annulus at the surface as a result of an acoustic shot for the well illustration in FIG. A.

Continuing to FIGS. 3A and 3B, the interface 34 has been pushed further downward by an increasing amount of nitrogen gas injected into the well. An acoustic shot signal 94 is produced from a firing of the gas gun 52 to produce a rarefaction pulse 94A. The interface 34 is still within the annulus 22 so the reflection pulse 94B has the same polarity (negative going) as the initial pulse.

Figure 4A:
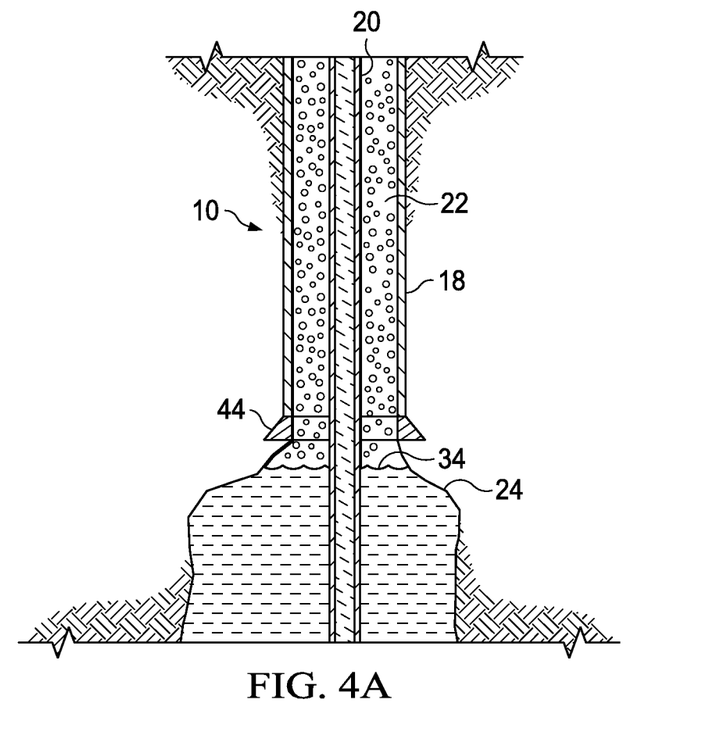
FIG. 4A is a partial section view of the cavern well bore shown in FIG. 1 showing a gas/liquid interface at the top of the chimney just below the end of the casing.
Figure 4B:
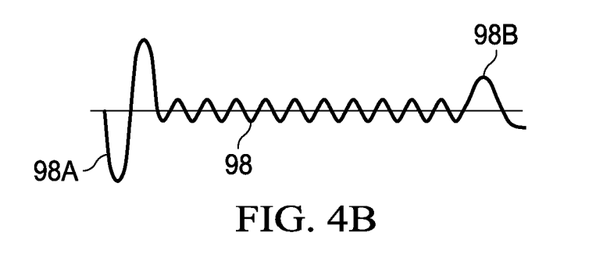
FIG. 4B is a waveform illustrating the signal monitored in the annulus at the surface as a result of an acoustic shot for the well illustration in FIG. 4A.
Figure 9:
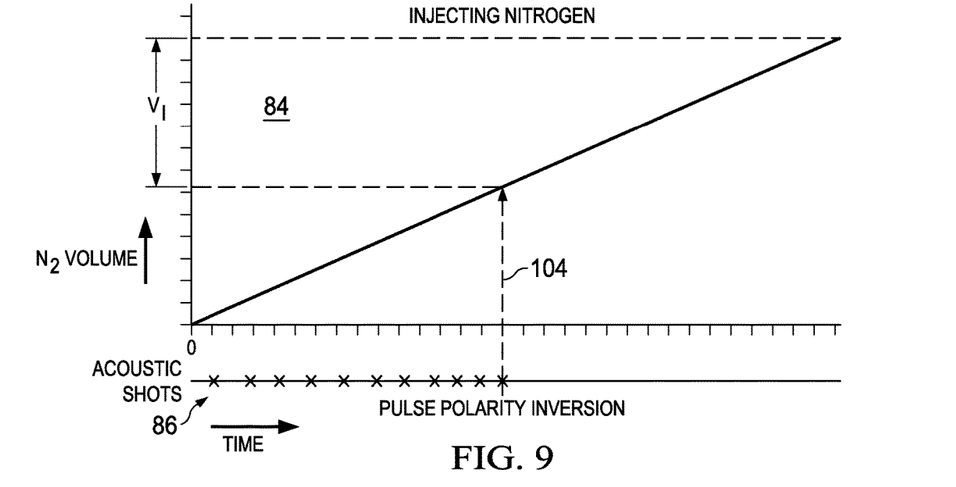
FIG. 9 is a chart illustrating the injecting of nitrogen gas into the well shown in FIG. 1 in conjunction with a series of acoustic shots.

In FIG. 4A, the continuing flow, either steady or irregular, of nitrogen gas has pushed the interface 34 down to below the casing shoe 44 in the chimney 24, and is slightly below the lower end of the casing 18. This is typically in the range of 2 to 5 feet. The gas gun 52 produces a rarefaction shot which leads to the acoustic shot signal 98 (FIG. 4B) from the microphone in the gas gun 52. The initial shot is shown as pulse 98A. At this level, the surface area of the interface 34 is greater than that of the cross-sectional area of the annulus 22 within the casing 18. When the pulse encounters a sudden increase in area, as compared to that of the annulus, an inverted reflection is created. This increase in area produces an inverted reflection pulse 98B. This polarity inversion indicates that the gas/liquid interface 34 is located at a level in the chimney 24 just below the end of the casing 18. This level is used as a reference point, and it is not necessary to make a measurement of the actual depth to this level. At the time that this polarity inversion is initially detected, the flow of nitrogen gas into the well is stopped. A predetermined standard volume of gas is then injected into the annulus 22 from tank 72. This is shown in FIG. 9 at the vertical line 104. This location of the interface 34, as shown in FIG. 4B is termed the "reference level" for the interface 34. It is also referred to as a cross-sectional area transition level because the casing or annulus area is less than the cross-sectional area of the upper end of the chimney 24 immediately below the casing 18. The volume of injected gas is $V_I$.

Figure 5:
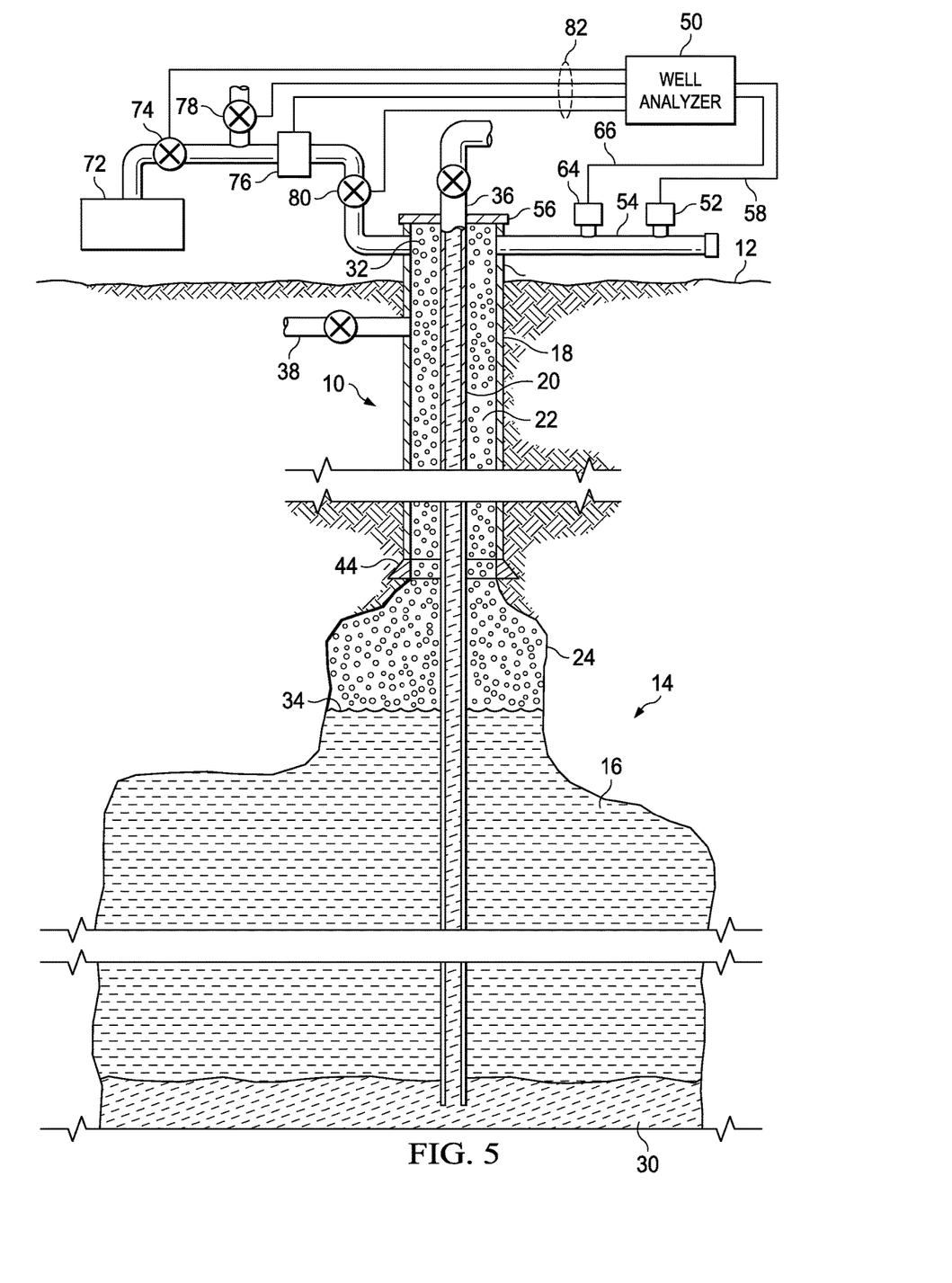
FIG. 5 is a vertical section view of a hydrocarbon storage cavern, as shown in FIG. 1, after injection of nitrogen gas to drive down the gas/liquid interface.

Referring to FIG. 5, there is shown the cavern 14 after the measured standard volume of nitrogen gas has been injected. The interface 34 has been pushed downward from its initial (reference level) to a lower location in the chimney 24.

Figure 6A:
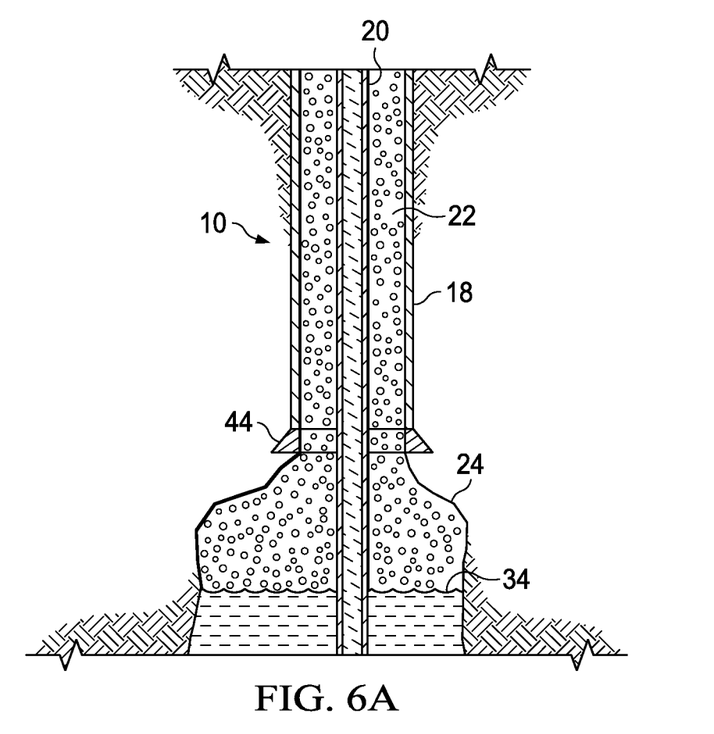
FIG. 6A is a partial section view of the cavern well bore shown in FIG. 1 showing a gas/liquid interface in the chimney.
Figure 6B:
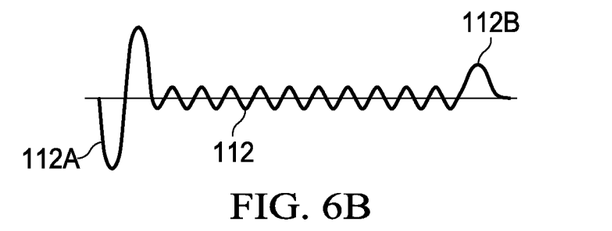
FIG. 6B is a waveform illustrating the signal monitored in the annulus at the surface as a result of an acoustic shot for the well illustration in FIG. 6A.

The second phase of the process is now described in reference to FIGS. 6A, 6B, 7A, 7B, 8A, 8B and 10. FIG. 6A illustrates the well bore 10 with a gas/liquid interface 34 which is located within the chimney 24 of the cavern 14. This is the location of the interface after the measured standard volume of nitrogen gas has been injected following the acoustic determination of the reference level of interface 34 shown in FIG. 4B. In this state, the cavern is not used or deliberately changed for a period of time to allow sufficient leakage to occur to be detected. This period of time is typically a few days, but could be a matter of weeks. The extent of the wait time is measured.

Figure 7A:
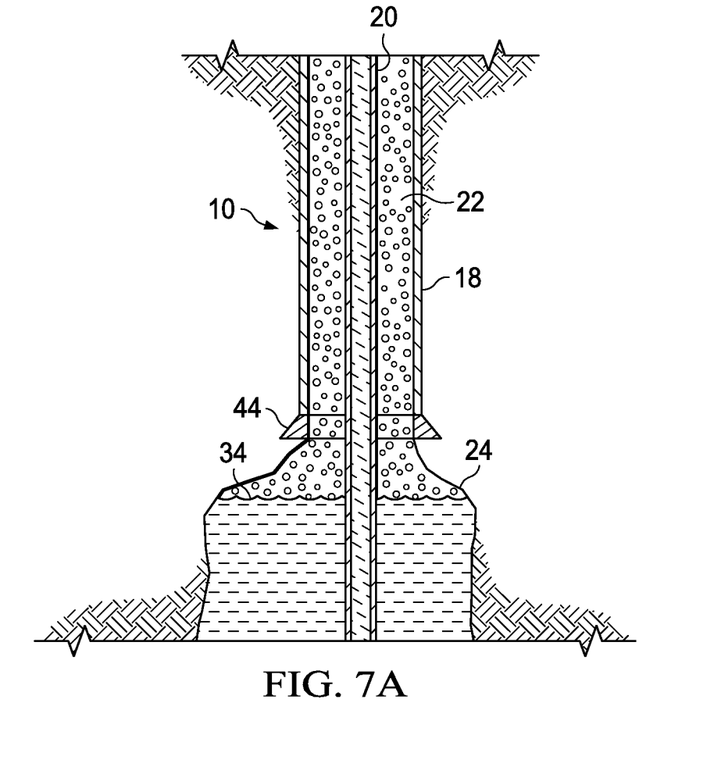
FIG. 7A is a partial section view of the cavern well bore shown in FIG. 1 showing a gas/liquid interface at a higher level from that shown in FIG. 6A.
Figure 7B:
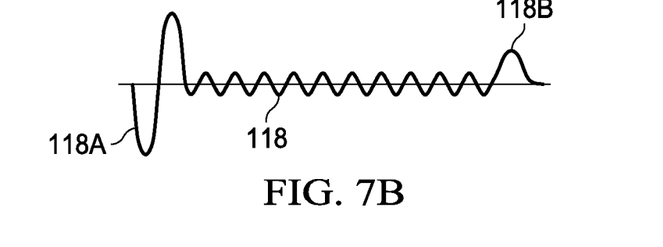
FIG. 7B is a waveform illustrating the signal monitored in the annulus at the surface as a result of an acoustic shot for the well illustration in FIG. 7A.

After the wait time has elapsed, the valves 78 and 80 (FIG. 1) are opened, manually or electrically, and the nitrogen gas in annulus 22 and chimney 24 is allowed to vent and the volume vented is measured by the nitrogen gas meter assembly 76. As the gas is vented, the interface 34 rises. After the venting begins, the gas gun 52 (FIG. 1) is repeatedly activated to produce a series of acoustics shots 110, each shown as a small x in FIG. 10. These are preferably rarefaction pulses. One of the early shots in the series 110 produces a signal 112 (FIG. 6B) which is sent to the well analyzer 50. A pulse 112A represents the initial shot and a pulse 112B represents the reflection from the interface 34 as located in FIG. 6A. This location is within the chimney 24 and the reflection area is greater than that of the area of the annulus 22, therefore the reflection pulse has the opposite polarity from that of the initial shot as indicated by pulse 112A. Because the reflection pulse is inverted, the interface level 34 is known to be lower than the reference level. As more gas is vented, the interface 34 continues to rise, as shown in FIG. 7A. One of the acoustic shots 110 produces a signal 118 as shown in FIG. 7B. At the initiation of the shot, pulse 118A is produced. In FIG. 7A, the interface 34 is located a short distance below the lower end of the casing 18. At this location, the surface area is still greater than that of the annulus 22, so a reflection pulse 118B, having the inverted polarity from that of the initial shot shown as pulse 118A, is produced. This indicates that the gas/liquid interface 34 is still located below the previously established reference level.

Figure 8A:
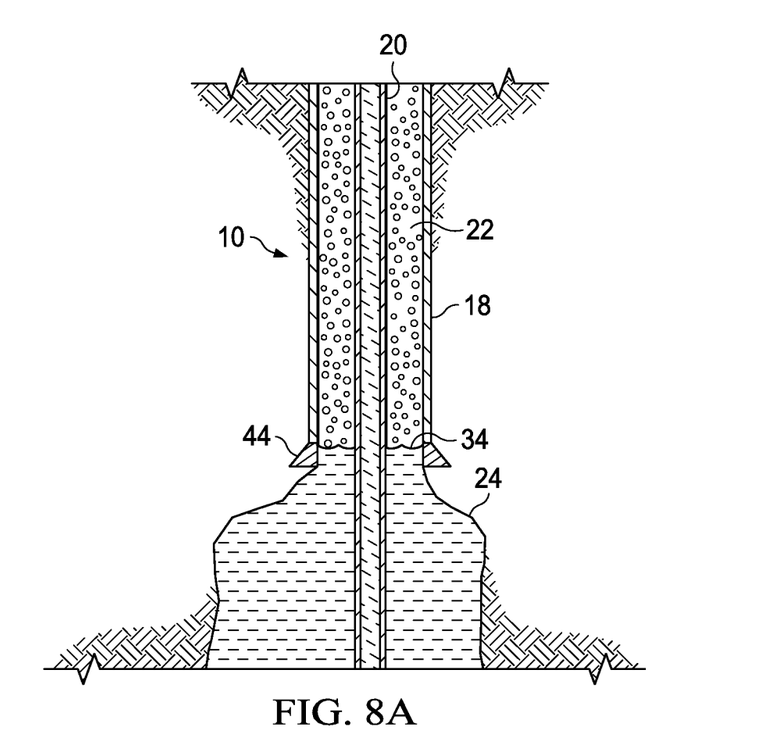
FIG. 8A is a partial section view of the cavern well bore shown in FIG. 1 showing a gas/liquid interface at the top of the chimney just below the end of the casing.
Figure 8B:
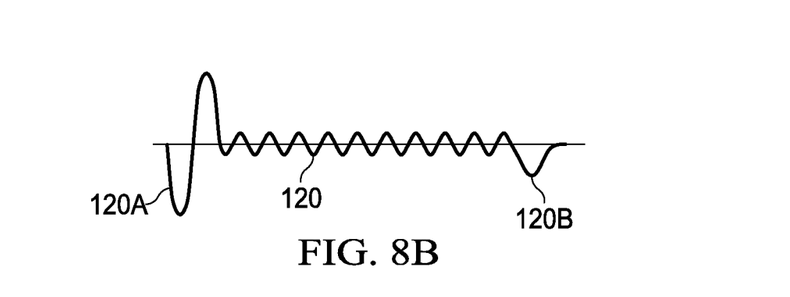
FIG. 8B is a waveform illustrating the signal monitored in the annulus at the surface as a result of an acoustic shot for the well illustration in FIG. 4A.
Figure 10:
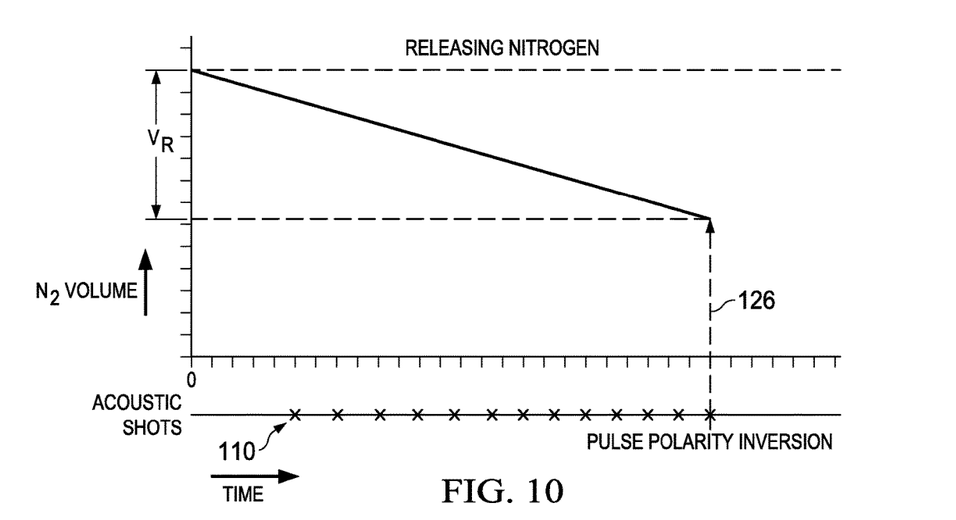
FIG. 10 is a chart illustrating the releasing of nitrogen gas from the well shown in FIG. 1 in conjunction with a series of acoustic shots.

Gas continues to be vented and shots 110 produced, as shown in FIG. 10. The interface 34 continues to rise until it reaches the level shown in FIG. 8A. This is just within the bottom end of the casing 18 and this corresponds closely to the reference level previously established. When the interface 34 reaches the level shown in FIG. 8A, the next of the shots 110 produces a signal 120 as shown in FIG. 8B. The initiation of the shot produces pulse 120A and the reflection pulse 120B from the interface 34, at the location shown in FIG. 8A. Because the interface 34 surface area is the same as that of the annulus 22, there is no polarity inversion, as there was with the reflection pulses shown in FIGS. 6B and 7B. This indicates that the interface 34 has returned to essentially the reference level. A typical measurement error is in the range of plus or minus a few feet. The initial shot to show a reflection inversion from the polarity of the preceding reflection is indicated by line 126 in FIG. 10. As shown in FIG. 10, the standard volume of gas released is $V_R$. The value of $V_R$ is recorded and preferably sent to the well analyzer 50.

For each cavern, or class of cavern, a reference value of maximum allowable leakage is established. This value is typically set by regulatory authorities. For example the Kansas Department of Health and Environment in Procedure #: UICLPG-20 (June, 2011) has set a maximum leak rate of 100 barrels of inert gas (nitrogen) per year. This reference number $V_{REF}$ is determined by multiplying the year time by the fraction of a year to obtain the reference value for the subject test. For example, if the test wait time was 4 days, the $V_{REF}$ is 100 b/y×(4/365)=1.1 barrels of nitrogen gas. The measured leakage is $\Delta V = V_I - V_R$. This is the difference between the amount of nitrogen injected and the amount released. If $\Delta V > V_{REF}$ this is an indication that the cavern is suffering from leakage and remediation action should be taken. But, if $\Delta V < V_{REF}$, then the cavern is working within the established limit and no action is needed.

A reference value for maximum leakage can also be established by use of long term studies of cavern leakage to develop a reasonable and safe value.

Alternatively, the actual leakage rate can be calculated. This is done with the formula: Leakage Rate=$\Delta V$/(waiting period). For example, if $\Delta V$=30 barrels and the time period is 10 days, the Leakage Rate is 3 barrels per day. This is compared to the maximum allowable leakage rate for the particular cavern under test. If, for example, the allowable leakage rate is 2 barrels per day, then the cavern is leaking excessively and remedial action should be taken.

Figure 11:
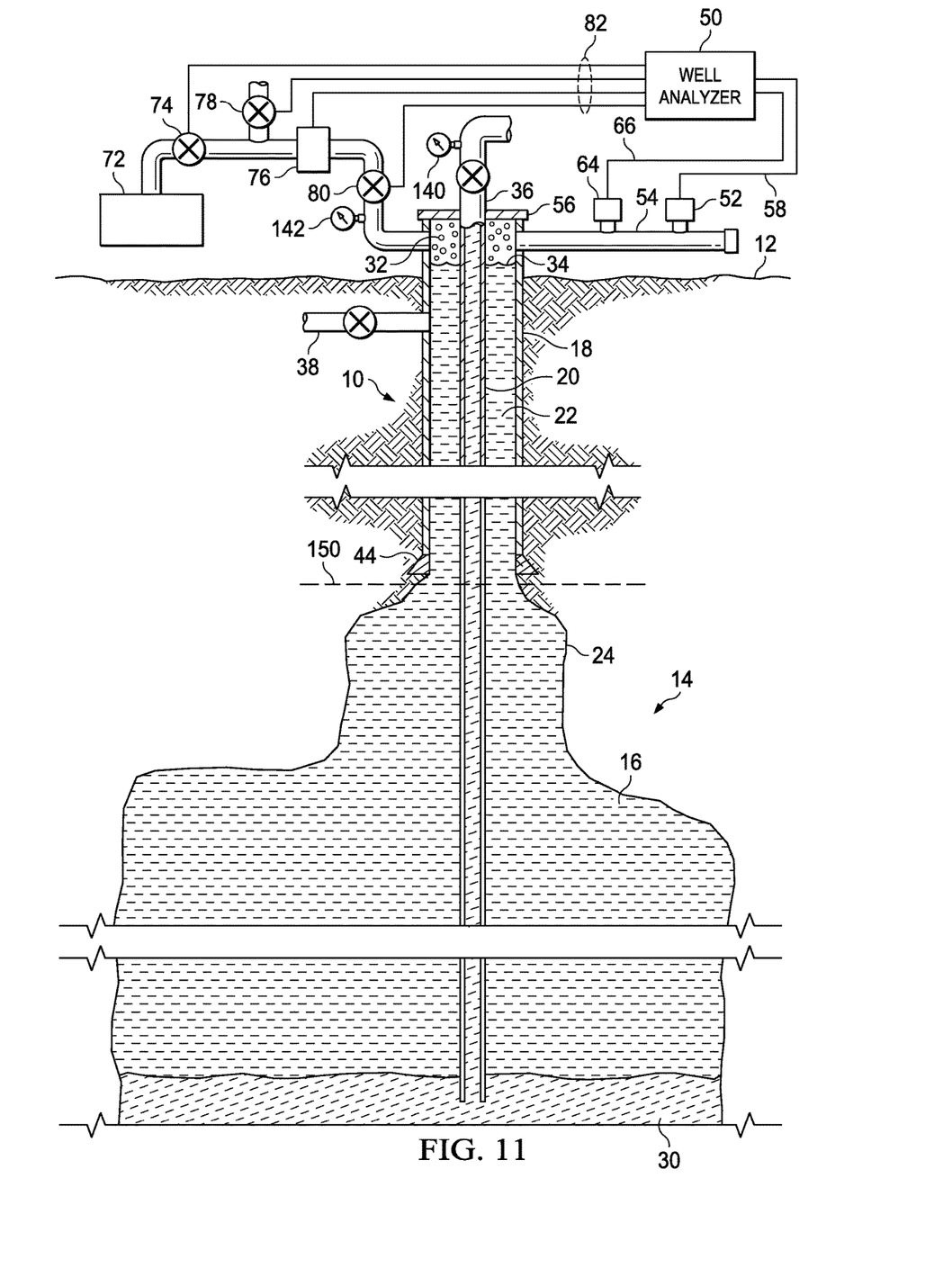
FIG. 11 is a section view of the well bore and associated equipment shown in FIG. 1 for illustrating an alternative embodiment of the invention.

A further embodiment of the invention is illustrated as shown in FIG. 11 in conjunction with FIGS. 2A, 2B, 3A, 3B, 4A and 4B. Referring to FIG. 11, the elements with reference numerals used in earlier figures are the same elements as previously described. In this configuration there are included a pressure gauge 140 to indicate the pressure at the surface within the tubing 20. A pressure gauge 142 indicates the pressure within the annulus 22. Valves 74, 78 and 80 are used to control the flow of nitrogen gas from tank 72 and from the annulus 22. This embodiment has a sequence of steps. The initial conditions at the wellhead are that the pressure in the annulus is, for example, 700 psi as indicated by gauge 142. The pressure inside the tubing 20 at the surface is, for example, 400 psi. The annulus 22 contains hydrocarbon liquid 16, such as crude oil, and the tubing contains brine 30. The pressures at these gauges are recorded. First, the valves 74 and 80 are opened to transfer nitrogen gas from the tank 72 into the annulus 22 to force the interface 34 downward. The volume of gas transferred into the annulus is measured by the gas meter assembly 76. The objective is to push the interface 34 down to just below the lower end of the casing 18.

Acoustic shots are produced by the gas gun 52, as previously described, and the resulting signals analyzed to detect the reflection from the interface 34. The process is the same as described above in reference to FIGS. 2A, 2B, 3A, 3B, 4A and 4B. Shots are produced and the polarity of the reflection pulse examined until the polarity of the reflection pulse is inverted from that of the initiation shot, thereby indicating that the interface, such as 34 in FIG. 4A is just below the lower end of the casing 18 in the upper end of the chimney 24. This location is shown by line 150. When this inversion of polarity is initially detected, the flow of nitrogen is stopped by closing valve 74. The volume of nitrogen gas injected is recorded. The pressure required is also recorded as indicated by gauge 142. This can be, for example, 1,380 psi. The well (bore hole) is then shut it and there is a waiting period, such as noted above. This is typically days or weeks.

At the end of the waiting period, the valves 78 and 80 are opened to vent the gas from the annulus 22. The volume of gas being vented from the annulus 22 is measured by the meter assembly 76. When the interface 34 returns to the top of the casing 18 at the surface 12, the gas release is stopped. The volume of gas injected and volume of gas released is compared, as previously described, to determine if there is a leak in either the cavern 14 or the casing 18 extending down to the cavern 14. Appropriate temperature and pressure compensation (gas laws) are applied if needed. Temperature profiles can be used which were previously collected for specific storage caverns. General temperature profiles for regions containing caverns can also be used.

A still further embodiment of the invention is described in reference to FIG. 11. In this embodiment, the same procedure is used to drive the interface 34 down to the reference level indicated by line 150. In this embodiment, the next step is to inject a predetermined standard volume of nitrogen gas into the annulus to drive the interface 34 further down into the chimney 24 to a level indicated by line 152. The release and measurement of the gas then proceeds as previously described above in reference to FIG. 11. The procedure for calculation and detection of leakage are the same as previously described. A further embodiment is to allow the interface 34 to return to the surface 12 and measure the volume of gas released from the casing 18. Thus, the steps are to inject gas to drive the interface 34 to the reference level, then inject a predetermined volume of gas, wait a period of time and then release all of the gas injected into the casing. The volumes of gas injected and released are measured. The total volume of injected gas is compared to the total volume of released gas to determine if there is leakage from the cavern or the bore hole.

The first embodiment described in reference to FIG. 11 primarily detects leakage in the casing 22, while the second embodiment primarily detects leakage in the combination of the casing 22 and a portion of the chimney 24. The chimney 24 portion is that between lines 150 and 152.

The embodiments described above utilize a well bore with both a casing and tubing. However, some storage caverns have bore holes which do not have the tubing, but only have the casing. This typically occurs when one cavern has multiple bore holes. The invention processes for this configuration (no tubing) is no different from that disclosed above. With no tubing, the casing is filled with hydrocarbon product and the acoustic pulses are transmitted through the gas in the casing above the fluid, not just through an annulus.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A method for establishing a reference level for a gas/liquid interface in an underground storage cavern wherein a bore hole extends from the surface down to the cavern, the bore hole having therein a casing that extends down to a chimney at the upper end of the cavern, the chimney having an opening area greater than the opening area of the casing, wherein the method comprises the steps of:
   (a) inject a gas into the casing to force the interface to a lower level,
   (b) with said gas/liquid interface located in the casing, transmit an acoustic pulse, having a first polarity, from the surface down the casing to the interface to produce a reflection pulse from the interface,
   (c) receive the reflection pulse and determine if the polarity of the received reflection pulse is the first polarity or a second polarity which is opposite to that of the first polarity, and
   (d) repeat steps (b) and (c) while injecting said gas until said reflection pulse initially has said second polarity, wherein the interface level in the well bore when said reflection pulse initially has said second polarity is established as the reference level for the gas/liquid interface.

2. A method for establishing a reference level for a gas/liquid interface in an underground storage cavern as recited in claim 1 wherein said bore hole includes a string of tubing within said casing and said acoustic pulses are carried in an annulus between said casing and said tubing.

3. A method for establishing a reference level for a gas/liquid interface in an underground storage cavern as recited in claim 1 wherein said transmitted acoustic pulses are rarefaction pulses.

4. A method for use in detecting leakage from an underground storage cavern wherein a bore hole extends from the surface down to the cavern, the bore hole having therein a casing which extends into the cavern, wherein the method comprises the steps of:
   (a) determine that a gas/liquid interface in said bore hole is at a cross-sectional area transition level,
   (b) inject an initial measured volume of gas into said casing at the surface,
   (c) wait for a period of time after injecting said initial measured quantity of gas,
   (d) after said period of time has elapsed, begin to release said gas from said casing at said surface and measure the quantity of said gas released from the casing,
   (e) transmit an acoustic pulse, having a selected polarity, from the surface down the casing to the interface to produce a reflection pulse,
   (f) receive the reflection pulse and determine if the polarity of the received reflection pulse is the selected polarity or the inverse of the selected polarity, (g) repeat steps (e) and (f) while releasing said gas from said casing until initially receiving said reflection pulse with said selected polarity, thereby establishing a known volume of gas that has been released when said selected polarity pulse is initially received, and (h) using said initial measured volume of gas and said known volume of gas to determine if there is excessive leakage from said storage cavern.

5. A method for use in detecting leakage from an underground storage cavern as recited in claim 4 wherein said bore hole includes a string of tubing within said casing and said acoustic pulses are carried in an annulus between said casing and said tubing.

6. A method for use in detecting leakage from an underground storage cavern as recited in claim 4 wherein said transmitted acoustic pulses are rarefaction pulses.

7. A method for detecting leakage from an underground storage cavern wherein a bore hole extends from the surface down to the cavern, the bore hole having therein a casing which extends down to a chimney at the upper end of the cavern, the chimney having an opening area greater than the opening area of the casing, wherein the method comprises the steps of:

(a) with an oil gas interface located in the casing above the chimney, transmit an acoustic pulse, having a first polarity, from the surface down the casing to the interface to produce a first phase reflection pulse, (b) receive the first phase reflection pulse and determine if the polarity of the received first phase reflection pulse is the first polarity or a second polarity which is opposite to that of the first polarity, (c) inject an gas into the casing to force the interface to a lower level, (d) repeat steps (a) and (b) while injecting said gas until said first phase reflection pulse initially has said second polarity, (e) after initially detecting said second polarity in said reflection pulse, inject an initial measured quantity of said gas into said casing at the surface, (f) wait for a period of time, (g) after said period of time has elapsed, begin to release said gas from said casing at said surface and measure the quantity of said gas released from the annulus, (h) transmit an acoustic pulse, having a selected polarity, from the surface down the casing to the interface to produce a second phase reflection pulse, (i) receive the second phase reflection pulse and determine if the polarity of the received second phase reflection pulse is the selected polarity or the inverse of the selected polarity, (j) repeat steps (h) and (i) while releasing said gas from said casing until initially receiving said second phase reflection pulse with said selected polarity, (k) determine the quantity of said gas which has been released from said casing of said well at the time when said second phase reflection pulse initially has said selected polarity, (l) determine the difference quantity between said initial measured quantity of said gas and said quantity of said gas which has been released from said casing of said well at the time when said second phase reflection pulse initially has said selected polarity, and (m) compare said difference quantity of said gas to a reference value to determine if the storage cavern has excessive leakage.

8. A method for detecting leakage from an underground storage cavern as recited in claim 7 wherein said bore hole includes a string of tubing within said casing and said acoustic pulses are carried in an annulus between said casing and said tubing.

9. A method for detecting leakage from an underground storage cavern as recited in claim 7 wherein said transmitted acoustic pulses are rarefaction pulses.

10. A method for detecting leakage from an underground storage cavern which has a bore hole that extends from a surface down to the cavern, the bore hole having installed therein a casing which extends down to the top of a chimney of the cavern, the cavern having hydrocarbon liquid stored therein with an interface of a gas and said liquid located at approximately the surface, the method comprising the steps of:

(a) initiate injection of a gas into the casing to force said interface downward in the bore hole, (b) measure the volume of said gas injected into said casing, (c) generate an acoustic pulse, having a first polarity, that is transmitted down the casing and reflected from said interface to produce a reflection pulse, (d) receive said reflection pulse and determine if the reflection pulse has a second polarity, which is the opposite of said first polarity, (e) repeat steps (c) and (d) while said gas is being injected into said casing until said second polarity is initially detected for said reflection pulse and when said second polarity is initially detected for said reflection pulse, terminate the injection of said gas into said casing, (f) wait for a period of time, (g) after said period of time has elapsed, begin to release said gas from said casing at said surface and measure the volume of said gas released from the casing, (h) terminate the release of said gas from said casing when said interface returns to the surface end of the casing, and (i) utilize the volume of said gas injected into said casing with the volume of said gas released from said casing to determine if there is excessive leakage from the cavern.

11. A method for detecting leakage from an underground storage cavern as recited in claim 10 wherein said bore hole includes a string of tubing within said casing and said acoustic pulses are carried in an annulus between said casing and said tubing.

12. A method for detecting leakage from an underground storage cavern as recited in claim 10 wherein said transmitted acoustic pulses are rarefaction pulses.

13. A method for detecting leakage from an underground storage cavern which has a bore hole that extends from a surface down to the cavern, the bore hole having installed therein a casing which extends down to the top of a chimney of the cavern, the chimney having an opening area greater than the opening area of the casing, the cavern having hydrocarbon liquid stored therein with an interface of a gas and said liquid located at approximately the surface, the method comprising the steps of:

(a) initiate injection of a gas into the casing to force said interface downward in the bore hole, (b) measure the volume of said gas injected into said casing, (c) generate an acoustic pulse, having a first polarity, that is transmitted down the casing and reflected from said interface to produce a reflection pulse, (d) receive said reflection pulse and determine if the reflection pulse has a second polarity, which is the opposite of said first polarity, (e) repeat steps (c) and (d) while said gas is being injected into said casing until said second polarity is initially detected for said reflection pulse and when said second polarity is initially detected for said reflection pulse, terminate injection of said gas into said casing, (f) after said injection of said gas has been terminated, wait for a period of time, (g) after said period of time has elapsed, begin to release said gas from said casing at said surface and measure the volume of said gas released from the casing, (h) terminate the release of said gas from said casing when said interface returns to the surface end of the casing, and (i) utilize the volume of said gas injected into said casing with the volume of said gas released from said casing to determine if there is excessive leakage from the cavern.

14. A method for use in detecting leakage from an underground storage cavern as recited in claim 13 wherein said bore hole includes a string of tubing within said casing and said acoustic pulses are carried in an annulus between said casing and said tubing.

15. A method for use in detecting leakage from an underground storage cavern as recited in claim 13 wherein said transmitted acoustic pulses are rarefaction pulses.

16. A method for detecting leakage from an underground storage cavern which has a bore hole that extends from a surface down to the cavern, the bore hole having installed therein a casing which extends down to the top of a chimney of the cavern, the cavern having hydrocarbon liquid stored therein with an interface of a gas and said liquid located at approximately the surface, the method comprising the steps of:

(a) initiate injection of an gas into the casing to force said interface downward in the bore hole, (b) measure the volume of said gas injected into said casing, (c) generate an acoustic pulse, having a first polarity, that is transmitted down the casing and reflected from said interface to produce a reflection pulse, (d) receive said reflection pulse and determine if the reflection pulse has a second polarity, which is the opposite of said first polarity, (e) repeat steps (c) and (d) while said gas is being injected into said casing until said second polarity is initially detected for said reflection pulse, (f) when said second polarity is initially detected for said reflection pulse, inject a predetermined volume of said gas into the casing to drive down said interface, (f) wait for a period of time, (g) after said period of time has elapsed, begin to release said gas from said casing at said surface and measure the volume of said gas released from the casing, (h) terminate the release of said gas from said casing when said interface returns to the surface end of the casing, and (i) utilize the volume of said gas injected into said casing with the volume of said gas released from said casing to determine if there is excessive leakage from the cavern.

17. A method for use in detecting leakage from an underground storage cavern as recited in claim 16 wherein said bore hole includes a string of tubing within said casing and said acoustic pulses are carried in an annulus between said casing and said tubing.

18. A method for use in detecting leakage from an underground storage cavern as recited in claim 16 wherein said transmitted acoustic pulses are rarefaction pulses.

* * * * *